May 6, 1930.  J. H. GOSS  1,757,424
FLOATING TRIM STUD
Original Filed Oct. 1, 1927
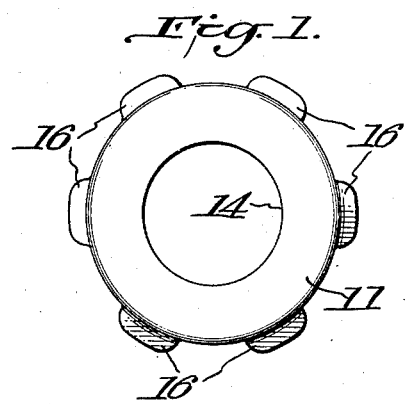
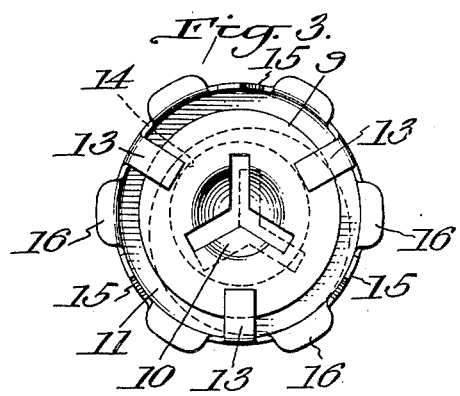
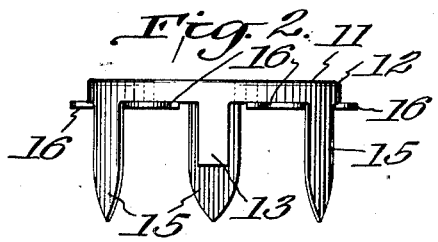
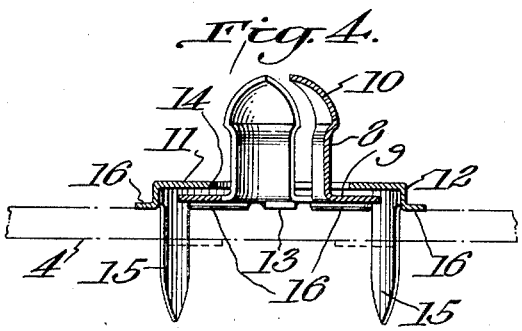
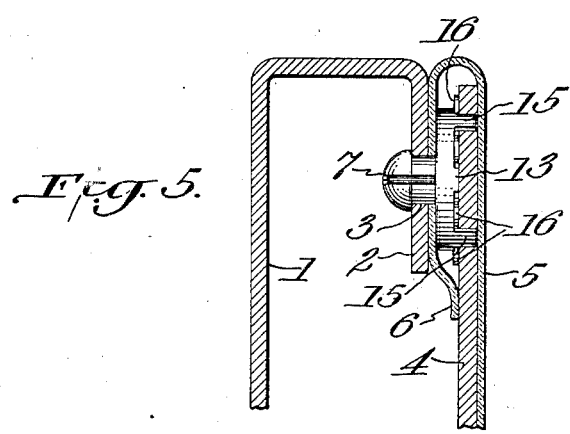
Inventor:
John H. Goss
by
Attorney.

Patented May 6, 1930

1,757,424

UNITED STATES PATENT OFFICE

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT

FLOATING TRIM STUD

Original application filed October 1, 1927, Serial No. 223,378. Divided and this application filed October 8, 1928. Serial No. 311,023.

This case is a division taken from my case filed October 1, 1927, Serial No. 223,378.

The object of this invention is to provide a stud for use primarily, but not exclusively, in attaching the trimming to automobile bodies which are built of metal, the stud being secured in place in such way that it may move or float on its attaching element to accommodate itself to the location of its complementary socket member, and the stud being attached on the surface of a supporting element, without the necessity of perforating such element for the passage of its head.

The invention consists of a trim stud, preferably of the spring variety, having a flange which is clipped in an attaching element or base in such way as to be freely movable therein or float thereon, and thereby permit the stud to move or float in any direction in order to find its way to the location of the stud-engaging or socket member, the base having attaching prongs by which the device may be set on the surface of the supporting member without the necessity of perforating the supporting member for the passage of the head of the stud, the base also having lateral outwardly projecting wings which rest upon the support or article to which the stud is applied and prevent the base from cutting into the support or article, as I will proceed now to explain more fully and finally claim.

In the accompanying drawings illustrating the invention, in the several figures of which like parts are similarly designated, Figure 1 is a top plan view, and Fig. 2 is a side elevation, illustrating a form of base having the laterally extending wings. Fig. 3 is a bottom plan view, and Fig. 4 is a vertical section showing the base of Figs. 1 and 2 supplied with the floating stud member. Fig. 5 is a section of a portion of a metal frame to be trimmed and a portion of the trimming and an elevation of the floating trim stud of this invention.

As in the original case, so here the invention is primarily designed for use in attaching the trimming or trim to metal-bodied automobiles, but it is obvious that it may be applied to other articles where useful.

I will describe my invention as applied to automobile bodies wholly or in part made of metal; and referring to Fig. 5, the numeral 1 may indicate a cross section of an angular metal door frame of an automobile, having the inturned flange 2 provided with openings 3, which last serve as sockets to engage the heads of the stud members. 4 may represent the cardboard or other supporting member used in trimming the frame, and 5 may represent the trimming of leather, cloth or other material, which is laid over the outer side of the cardboard and its end or edge 6 turned over upon the inner side of the cardboard and confined by the fastening means comprising the socket 3 and a stud, designated generally by the numeral 7.

The head of the floating stud comprises a slitted spring shank 8 terminating in a flange 9 at one end and a conoidal head 10 at the other end. The flange 9 is only partly slitted, as shown in Figs. 3 and 4.

11 is the top portion or face of the base member, and this portion is provided with a downturned rim flange 12, and a series of fingers 13 projecting from the lower edge of the flange and bent inwardly so as to extend beneath the flange 9 upwardly from the bottom of the rim flange 12 to support the stud head in the base. The top portion 11 is provided with an opening 14 which is of a diameter considerably greater than the diameter of the shank 8 and the conoidal head 10, so as to permit lateral movement in any direction of the stud head within its base, as indicated in part by the dotted lines in Fig. 3, whereby when the stud head is attached and put in place it may float or move laterally in any direction within the base, in order to find the corresponding socket in the frame with which it cooperates, in the event that these two portions of the fastening medium should not actually register in the first instance. By these means, it is not necessary to change the location of the stud on its support in the event of failure of the fastening elements to register.

The base is further supplied with attaching prongs 15, depending from the flange 12, and these prongs are adapted to be forced through the supporting member 4 and clinched thereon in order to secure the stud in place. As indicated in Figs. 4 and 5 the base is located on the surface of the supporting member 4 and without the necessity, heretofore common, of perforating the supporting member for the passage of the head of the stud therethrough. When the device is in position as shown in Figs. 4 and 5, the prongs 15 may be clinched by turning them inwardly on the supporting member, as indicated in Figs. 4 and 5, or they may be turned outwardly, if desired. The outward turning of the prongs is preferred because there is thus removed one element of potential crushing effect on the fingers 13.

As shown, the peripheral flange 12 has the lateral outwardly extending wings 16, in addition to the fingers 13 and prongs 15. The wings serve as a protection to the stud-retaining fingers when the fastener is set. These wings also enable the base to lie relatively flat against the supporting member or cardboard, with the thickness of the metal as a protection or assurance against the stud-retaining fingers crushing; and they present a broader contact face between the base and the cardboard than the rim of the flange itself, thereby eliminating the possibility of the edge of the flange cutting into the supporting member or cardboard. It will be understood that these laterally extending wings are an additional safeguard against the crushing in of the stud head supporting fingers, and they prevent the sinking of the base into the supporting member to such an extent as would obstruct the floating of the stud head.

As shown in Fig. 4, the supporting member 4 is represented in dotted lines, and the attaching prongs are shown clinched inwardly, but as already indicated, the clinching of the prongs may be by either an inward or an outward bending.

The stud and its base are located on the inner side of the supporting member 4, so that there is no appreciable projection on the opposite side which would tend to produce humps or protuberances in the trim or trimming material. This is an advantage incident to my invention and one of considerable importance. Another advantage is that the floating capacity of the stud is practically permanently preserved and with little or no exposure to impairment.

Variations in the details of construction are permissible within the principle of the invention and the claims following.

What I claim is:—

1. A stud, comprising a socket-engaging head and a bottom flange, and an attaching base within which the said flange is located and having an opening of greater diameter than the head of the stud through which such head extends outwardly, said base having a peripheral downturned flange provided with inturned fingers for supporting the flanged head in a laterally movable manner within the base, and also provided with laterally projecting outwardly extending wings adapted to rest on the surface of a support to prevent the base from sinking into the support.

2. A stud, comprising a socket-engaging head and a bottom flange, and an attaching base within which the said flange is located and having an opening of greater diameter than the head of the stud through which such head extends outwardly, said base having a peripheral downturned flange provided with inturned fingers for supporting the flanged head in a laterally movable manner within the base, and wings projecting laterally and outwardly from the bottom of the flange so as to rest upon the surface of a support and prevent the base from cutting into the support.

3. A stud, comprising a socket-engaging head and a bottom flange, and an attaching base within which the said flange is located and having an opening of greater diameter than the head of the stud through which such head extends outwardly, said base having a peripheral downturned flange provided with inturned fingers for supporting the flanged head in a laterally movable manner within the base, prongs projecting from the bottom of the downturned flange and adapted to engage a supporting member, and laterally projecting wings on said flange adapted to rest on the surface of the supporting member and prevent the sinking of the base into said supporting member to such an extent as to obstruct the floating of the head.

4. A floating trim stud, having a head member comprising a resilient shank and head, and a flange at its end opposite said head, and a base provided with a central opening of considerably greater diameter than the diameter of said shank and a flanged rim provided with fingers so turned inwardly beneath the flange of the head member as to support the head member above the level of the lower level of the rim flange and permit freedom of lateral motion of the head member within its base so as to accommodate the head member to its complemental socket member, wings projecting laterally from the flanged rim, and attaching prongs extending from the lowermost edge of the rim flange in a direction away from the head member, so that the device may be located on the inner or unexposed side of a supporting member and thereby avoid protuberances on the outer or exposed side.

In testimony whereof I have hereunto set my hand this 6th day of October, A. D. 1928.

JOHN H. GOSS.